(12) United States Patent
Ergen et al.

(10) Patent No.: US 11,317,287 B2
(45) Date of Patent: Apr. 26, 2022

(54) METHOD AND SYSTEM FOR AUTHENTICATING CELLULAR DEVICES AND NON-SIM DEVICES FOR ACCESSING A WI-FI ACCESS POINT USING A CLOUD PLATFORM

(71) Applicant: Ambeent Wireless Bilişim ve Yazilim A.Ş, Istanbul (TR)

(72) Inventors: Mustafa Ergen, Istanbul (TR); Hasan Şildir, Istanbul (TR); Sinem Çöleri Ergen, Istanbul (TR)

(73) Assignee: Ambeent Inc., Istanbul (TR)

(*) Notice: Subject to any disclaimer, the term of this patent is extended or adjusted under 35 U.S.C. 154(b) by 0 days.

(21) Appl. No.: 15/937,830

(22) Filed: Mar. 27, 2018

(65) Prior Publication Data

US 2021/0400485 A1 Dec. 23, 2021

Related U.S. Application Data (60) Provisional application No. 62/601,532, filed on Mar. 27, 2017.

(51) Int. Cl.
*H04W 12/08* (2021.01)
*H04W 76/10* (2018.01)
(Continued)

(52) U.S. Cl.
CPC ........ *H04W 12/08* (2013.01); *G06F 16/9537* (2019.01); *G06K 7/1417* (2013.01); *G06N 20/00* (2019.01); *H04L 63/101* (2013.01); *H04W 12/06* (2013.01); *H04W 12/63* (2021.01); *H04W 64/00* (2013.01); *H04W 76/10* (2018.02); *G06Q 20/145* (2013.01); *H04L 67/10* (2013.01); *H04W 84/12* (2013.01)

(58) Field of Classification Search
CPC ..... H04W 12/08; H04W 76/10; H04W 12/63; H04W 12/06; H04W 64/00; H04W 84/12; G06N 20/00; G06F 16/9537; G06K 7/1417; H04L 63/101; H04L 67/10; G06Q 20/145
USPC ........................................................ 726/4
See application file for complete search history.

(56) References Cited

U.S. PATENT DOCUMENTS

2007/0133780 A1* 6/2007 Berner ............... H04M 3/5166
379/265.01
2009/0279430 A1* 11/2009 Huber ............... H04W 72/1226
370/230.1

(Continued)

*Primary Examiner* — Josnel Jeudy
(74) *Attorney, Agent, or Firm* — Farrell Patent Law PC; Mark Farrell (57) ABSTRACT

The invention provides a method and system for establishing a connection between a client device of a plurality of client devices and a Wi-Fi access point of a plurality of Wi-Fi access points using a cloud platform. One or more cellular devices and one or more non-Subscriber Identity Module (non-SIM) devices of a user are registered at the cloud platform. The one or more non-SIM devices are then associated to the one or more cellular devices. Further, each Wi-Fi access point of the plurality of Wi-Fi access points is also registered at the cloud platform. A location of the client device is identified and one or more Wi-Fi access points that are closest to the client device is identified. The one or more Wi-Fi access points then authorize the client device to access the one or more Wi-Fi access points based on the information provided by the cloud platform.

40 Claims, 4 Drawing Sheets

(51) Int. Cl.
*H04W 64/00* (2009.01)
*H04W 12/06* (2021.01)
*H04W 12/63* (2021.01)
*G06K 7/14* (2006.01)
*G06F 16/9537* (2019.01)
*G06N 20/00* (2019.01)
*H04L 29/06* (2006.01)
*G06Q 20/14* (2012.01)
*H04L 67/10* (2022.01)
*H04W 84/12* (2009.01)

(56) References Cited

U.S. PATENT DOCUMENTS

| | | | |
|---|---|---|---|
| 2015/0141005 A1* | 5/2015 | Suryavanshi | H04W 48/16 |
| | | | 455/434 |
| 2015/0215832 A1* | 7/2015 | Fitzpatrick | H04W 36/00837 |
| | | | 455/426.1 |
| 2016/0261596 A1* | 9/2016 | Khello | H04L 63/0892 |
| 2017/0272950 A1* | 9/2017 | Venkataramanachari | |
| | | | H04W 12/06 |
| 2017/0280324 A1* | 9/2017 | Beals | H04M 3/42153 |
| 2017/0374602 A1* | 12/2017 | Gokturk | H04W 48/20 |
| 2019/0069162 A1* | 2/2019 | Lindheimer | H04W 48/04 |
| 2020/0146080 A1* | 5/2020 | Bot | H04W 64/006 |
| 2021/0400466 A1* | 12/2021 | Chaugule | H04W 88/02 |
| 2022/0060893 A1* | 2/2022 | Gundavelli | H04W 12/06 |

* cited by examiner

METHOD AND SYSTEM FOR AUTHENTICATING CELLULAR DEVICES AND NON-SIM DEVICES FOR ACCESSING A WI-FI ACCESS POINT USING A CLOUD PLATFORM

FIELD OF THE INVENTION

The invention generally relates to establishing a connection between a client device of a plurality of client devices and a Wi-Fi access point of a plurality of Wi-Fi access points using a cloud platform. More specifically, the invention relates to seamless authentication of client devices such as cellular devices and non-SIM devices by operators of Wi-Fi access points for accessing the Wi-Fi access points using machine learning integrated cellular sensing techniques using the cloud platform.

BACKGROUND OF THE INVENTION

Wi-Fi networks are formed using one or more Wi-Fi access points that support a connection of multiple wireless devices such as, but not limited to, cellular devices and Wi-Fi devices, to a wired connection for access to the Internet. Wi-Fi devices are widely used in residential, office and hotspot environments.

Wi-Fi networks provide data access to Wi-Fi client embedded devices to access the Internet or the network. Wi-Fi networks in residential areas are configured by a key and are included in the beginning when a residential Wi-Fi access point is turned on and the user can seamlessly use the Wi-Fi access network. In a similar manner, office/enterprise Wi-Fi networks can also be used seamlessly. However, in other areas such as restaurants, cafes, hotels and airports, Wi-Fi users suffer from seamless authentication, since they need to select the Wi-Fi access point provider and enter the corresponding login and password.

Further, there are many operators that provide both Digital Subscriber Line (DSL) and cellular Internet connection. In practice, these architectures are decentralized and the customers do not have a broadband sharing mechanism for seamless Wi-Fi authentication.

Therefore, in light of the above, there is a need for a method and system that provides a flexible and secure mechanism for seamless authentication of Wi-Fi devices by operators of Wi-Fi access points for accessing the Wi-Fi access points using machine learning integrated cellular sensing techniques using a cloud platform.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to seamless authentication of client devices such as cellular devices and non-SIM devices by operators of Wi-Fi access points for accessing the Wi-Fi access points using machine learning integrated cellular sensing techniques using a cloud platform.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for establishing a connection between a client device of a plurality of client devices and a Wi-Fi access point of a plurality of Wi-Fi access points using a cloud platform. Two or more client devices of a user are registered with a user account at the cloud platform. The two or more client devices include one or more cellular devices and one or more non-Subscriber Identity Module (non-SIM) devices. The one or more non-SIM devices are then associated to the one or more cellular devices. Further, each Wi-Fi access point of the plurality of Wi-Fi access points is also registered at the cloud platform. In order to establish a connection between a client device of the plurality of client devices and a Wi-Fi access point of the plurality of Wi-Fi access points, a location of the client device is identified at the cloud platform, wherein the client device is either a cellular device or a non-SIM device. One or more Wi-Fi access points of the plurality of Wi-Fi access point that are closest to the client device are also identified. Once the one or more Wi-Fi access points are identified, the cloud platform transmits information associated with the client device to the one or more Wi-Fi access points. Upon receiving the information, the one or more Wi-Fi access points authorize the client device for accessing the one or more Wi-Fi access points based on the information associated with the client device.

Figure 1:
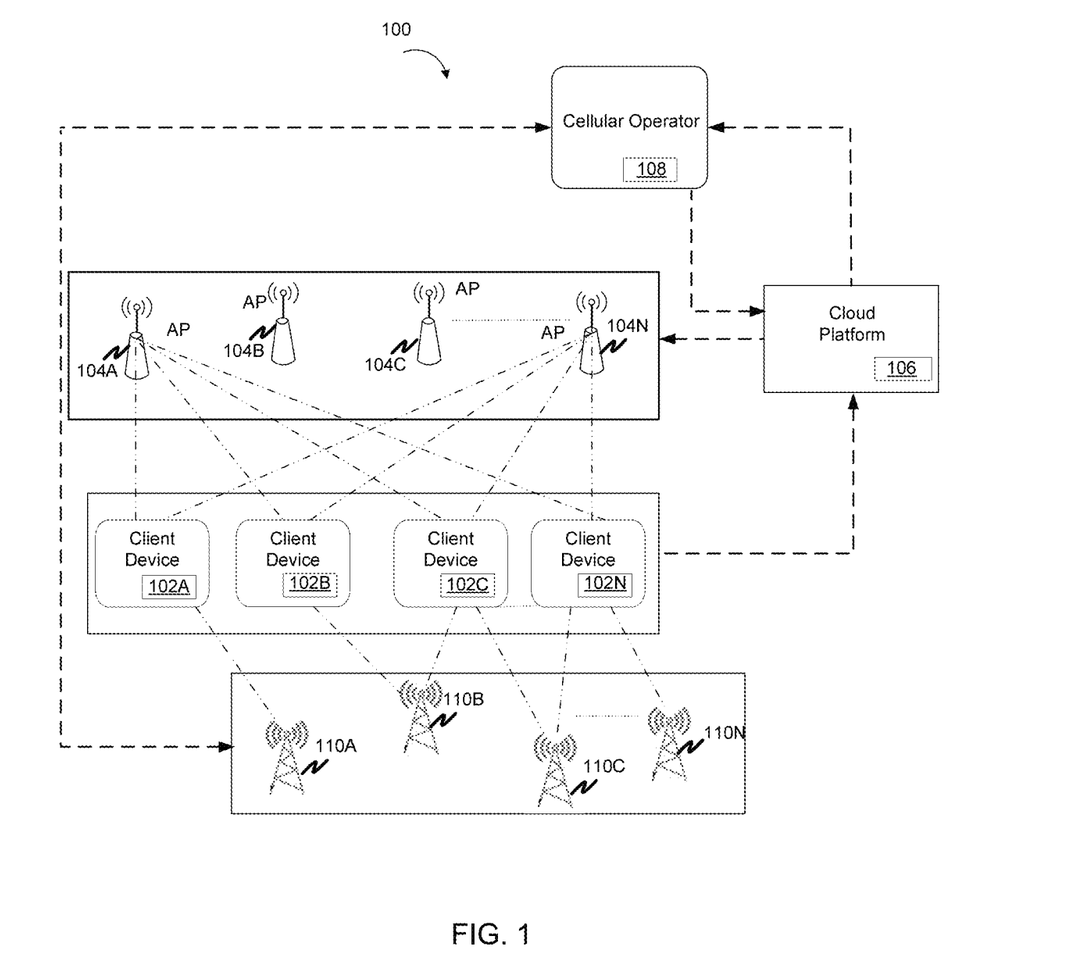
FIG. 1 illustrates a system for establishing a connection between a client device of a plurality of client devices and a Wi-Fi access point of a plurality of Wi-Fi access points in accordance with an embodiment of the invention.

FIG. 1 illustrates a system 100 for establishing a connection between a client device 102A of a plurality of client devices 102A-102N and a Wi-Fi access point 104A of a plurality of Wi-Fi access points 104A-104N using a cloud platform 106 in accordance with an embodiment of the invention.

As illustrated in FIG. 1, system 100 includes plurality of client devices 102A-102N and plurality of Wi-Fi access points 104A-104N in communication with cloud platform 106. Plurality of client devices 102A-102N are user devices such as, but not limited to, a mobile device, a personal digital assistant, a computer, a laptop, a smart phone and a tablet. Accordingly, a client device can be, but need not be limited to, a cellular or SIM-capable device and a non-Subscriber Identity Module (non-SIM) or Wi-Fi only device. A non-SIM device is a device with no SIM card or cellular network capability. Plurality of Wi-Fi access points 104A-104N are deployed in places such as, but not limited to, homes, enterprises and public spaces.

In accordance with system 100, two or more client devices of plurality of client devices 102A-102N of a user are registered with a user account at cloud platform 106. The two or more client devices include one or more cellular devices and one or more non-SIM devices.

The one or more non-SIM devices are then associated to the one or more cellular devices at cloud platform 106.

Further, each Wi-Fi access point of plurality of Wi-Fi access points 104A-104N is also registered at cloud platform 106.

In order to establish a connection between a client device 102A of plurality of client devices 102A-102N and a Wi-Fi access point 104A of plurality of Wi-Fi access points 104A-104N, a location of client device 102A is identified at cloud platform 106, wherein client device 102A is either a cellular device or a non-SIM device. Subsequently, one or more Wi-Fi access points of plurality of Wi-Fi access points 104A-104N that are closest to client device 102A are also identified.

In order to identify the one or more Wi-Fi access points that are closest to client device 102A, in one embodiment, a cellular operator 108 obtains the approximate location of a cellular base station 110A of plurality of cellular base stations 110A-110N and associates geographically closer Wi-Fi access points of plurality of Wi-Fi access points 104A-104N to a cellular base station ID of cellular base station 110A.

In another embodiment, cellular operator 108 identifies the one or more Wi-Fi access points that are closest to client device 102A through localization or triangulation techniques and feeds the information to cloud platform 106.

Figure 2:
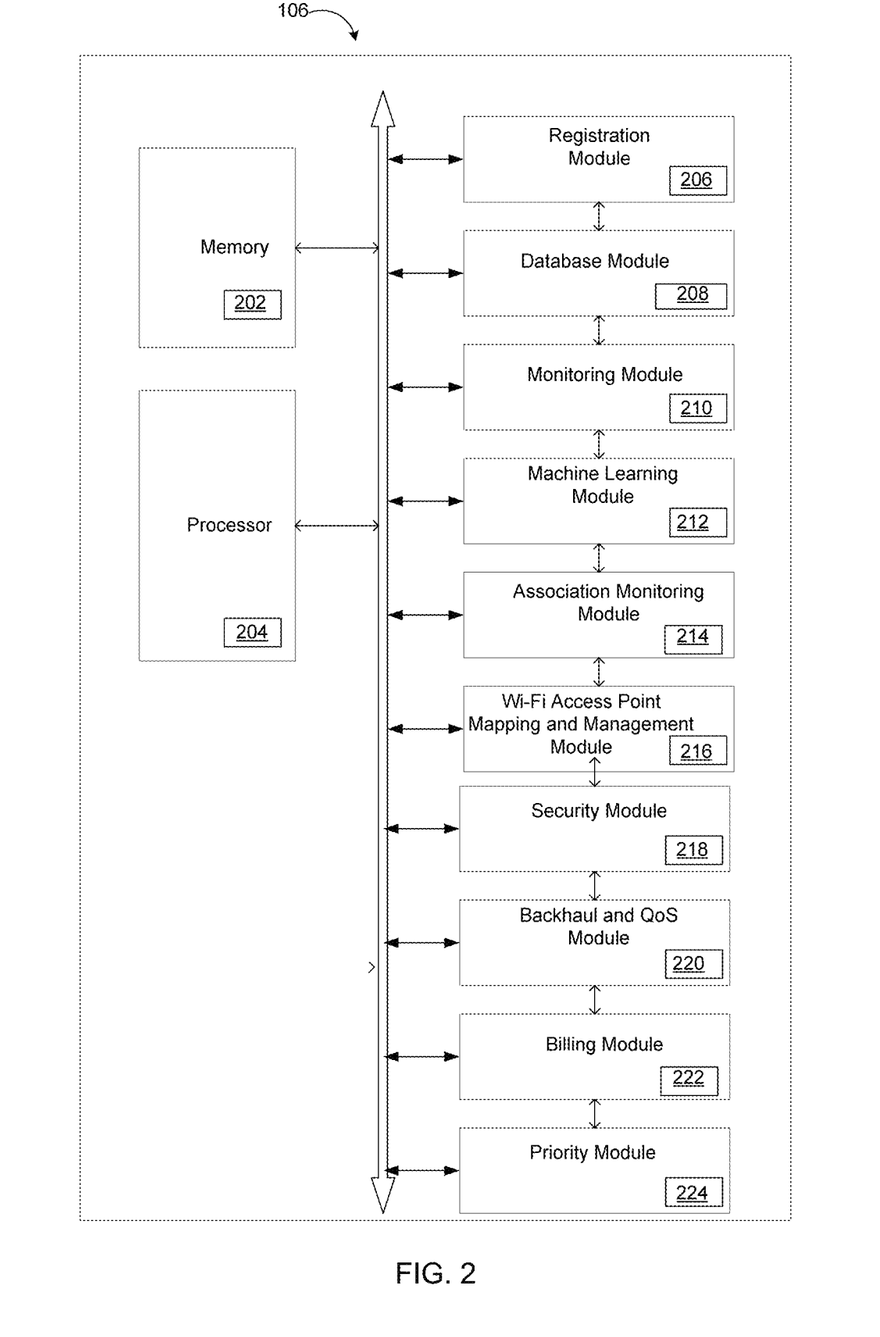
FIG. 2 illustrates various modules integrated with a cloud platform for establishing a connection between a client device of a plurality of client devices and a Wi-Fi access point of a plurality of Wi-Fi access points in accordance with an embodiment of the invention.

Various modules integrated with cloud platform 106 are further described in detail in conjunction with FIG. 2.

Once the one or more Wi-Fi access points are identified, cloud platform 106 transmits information associated with client device 102A to the one or more Wi-Fi access points. The information transmitted from cloud platform 106 includes credentials associated with the user and client device 102A. Upon receiving the information, the one or more Wi-Fi access points authorize client device 102A for accessing the one or more Wi-Fi access points based on the information associated with client device 102A.

FIG. 2 illustrates various modules integrated with cloud platform 106 for establishing a connection between client device 102A and Wi-Fi access point 104A in accordance with an embodiment of the invention.

As illustrated in FIG. 2, cloud platform 106 includes a memory 202 and a processor 204 communicatively coupled to memory 202. Memory 202 and processor 204 are communicatively coupled to various modules of cloud platform 106.

Cloud platform 106 includes a registration module 206 in order to register the two or more client devices associated with the user with the user account. The two or more clients include one or more cellular devices and one or more non-SIM devices. Registration module 206 enables registration of the two or more client devices of the user by enabling the user to interact with a web page or through a call center. Further, the user may register the two or more client devices through a Quick Response (QR) code reader application installed on the two or more client devices. The QR code reader application results in delivery of details associated with the two or more client devices and registers credentials associated with the two or more client devices such as, but not limited to, Phone Number, SIM Card ID, Mobile Station International Subscriber Directory Number (MSISDN), International Mobile Subscriber Identity (IMSI), Temporary IMSI (TIMSI) and MAC address associated with the two or more client devices. These details are registered with the user account. The registration process is further explained in detail as follows.

To start with, the user associates the one or more cellular devices to cloud platform 106 using registration module 206 using the SIM card ID, IMEI and the Wi-Fi MAC address of the one or more cellular devices along with a few security keywords. Further, the user adds and registers the one or more non-SIM devices to the user account using the MAC addresses of the one or more non-SIM devices. A tuple is then created and in an example, the user account with the tuple is as follows:

<User Profile, SIM IDs, Cellular device Wi-Fi MAC Address, Phone number, IMEI, Security Keyword, Other Wi-Fi MAC Address 1, Other Wi-Fi MAC Address 2, . . . >

Registration Module 206 then enables the user to associate the one or more cellular devices to cellular operator 108 in order to relate an account of the cellular card of the one or more cellular devices with cellular operator 108 to identify the user for billing and for tracking the activity of the one or more cellular devices from cellular signals.

Next, registration module 206 further enables the user to register the one or more non-SIM devices through their MAC addresses and has full control over the connectivity status of the one or more non-SIM devices registered with the user account.

The registration process is a one-time operation and may be done in several ways unless an update is necessary due to user preferences, device changes and security considerations.

Once the user has registered the one or more cellular devices and the one or more non-SIM devices, registration module 206 associates the one or more non-SIM devices to the one or more cellular devices. For instance, a cellular device is associated to multiple non-SIM devices. In another instance, a non-SIM device registered with the user account is associated to multiple cellular devices.

The association of the one or more non-SIM devices to the one or more cellular devices, enables the one or more non-SIM devices to be authenticated if any of the one or more cellular device owners are in the Wi-Fi hotspot zone, since the one or more non-SIM devices are assumed to be very close to the one or more cellular devices. Since the position of the one or more non-SIM devices cannot be determined through cellular signals, the one or more cellular devices are used to match or determine position of the one or more non-SIM devices.

Cloud platform 106 then includes a database module 208 for creating an association table that associates the one or more non-SIM devices to the one or more cellular devices. For associating a non-SIM device to a cellular device, MAC address of the non-SIM device is coupled with the cellular device SIM card ID. SIM card ID is associated with the cellular device IMEI and the cellular device IMEI is associated with the cellular device Wi-Fi MAC address.

Existing information in database module 208 is further modified or updated either manually or through a process similar to registration. For instance, if the SIM card is replaced in a cellular device, an alarm is triggered to indicate that the cellular device Wi-Fi MAC address has changed which in turn triggers the user registration process in registration module 206, whereas the other Wi-Fi MAC addresses are kept the same. In another instance, if the SIM card of the cellular device is transferred to another user, registration module 206 understands that the profile of the user has changed and deletes the SIM card-MAC address associations pertaining to the cellular device in database module 208 and triggers an update to the user along with security considerations.

Further, registration module 206 enables registration of each Wi-Fi access point of plurality of Wi-Fi access points 104A-104N to cloud platform 106 by respective Wi-Fi access pointer owners. Once the registration process is accomplished in registration module 206, cloud platform 106 sets the SSID configuration for each Wi-Fi access point.

The SSID configuration for a Wi-Fi access point may be open or closed. If the SSID configuration is open, only the SSID is known by users and is configured once. If the SSID configuration is closed, then, both the SSID and Password are configured once. When the SSID configuration is open for a Wi-Fi access point, all other users try to connect but are rejected by the Wi-Fi access point and when the SSID configuration is closed, only certain configured clients are authenticated to access the Wi-Fi access point. Also, registration module 206 enables periodically updating of the SSID-Password tuples in plurality of client devices 102A-102N and plurality of Wi-Fi access points 104A-104N.

Database module 208 further creates a Wi-Fi access point association table to associate each Wi-Fi access point of plurality of Wi-Fi access points 104A-104N to cloud platform 106. This is a one-time operation and the Wi-Fi access point association table is built to associate geographically closer Wi-Fi access points of plurality of Wi-Fi access points 104A-104N to a cellular base station ID of a cellular base station 110A of plurality of cellular base stations 110A-110N.

Moving on, cloud platform 106 includes a monitoring module 210 that determines a location of client device 102A. Client device 102A may be cellular device or a non-SIM device.

If client device 102A is a cellular device, monitoring module 210 determines location of the cellular device and associates the location of the cellular device to proximate Wi-Fi access points of plurality of Wi-Fi access points 104A-104N in order to establish the connection.

On the other hand, if client device 102A is a non-SIM device, monitoring module 210 uses database module 208 to determine the cellular device associated to the non-SIM device and determines the location of the cellular device. The location of the non-SIM device is then determined using the location of the cellular device.

The location of the cellular device is identified using several techniques. Since the cellular device is always active and is always connected to a particular cell tower, the exact cell tower is determined once the user associated with the cellular device starts the association in order to make a phone call or a similar interaction may be considered. The approximate location of the cellular device is determined based on a fixed position of the cell tower, which is correlated to the geographic density of the cell towers.

Long Term Evolution (LTE) positioning systems are further utilized for improving accuracy of determination of the location of the cellular device. When the cellular device of the user does not have a direct cellular connection with the cell tower, the approximate location of the cellular device is determined from the paging policy of cellular operator 108 that delivers a wider hull from several cell nodes. The approximate position of the cellular device is stored in database module 208 recursively and is utilized by a machine learning module 212 integrated with cloud platform 106. Machine learning module 212 is further explained in detail as follows.

Cellular sensing is a cost effective tool to determine the approximate location of the cellular device that triggers nearby Wi-Fi access points of plurality of Wi-Fi access points 104A-104N to provide Wi-Fi Internet access to the cellular device or to a non-SIM device. Once the location of the user has significant amount of uncertainty, the number of Wi-Fi access points may be very high. Therefore, in order to broaden the practical limits, a database is constructed from measurements collected during the direct access of the user to a cellular node in order to provide an estimation of the probable position of the cellular device in routine progress by machine learning module 212, for the scheduling and planning. The machine learning algorithm of machine learning module 212 utilizes the historical and accurate measurements from the cellular device to construct a behavior map that summarizes historical download map for different locations at different times. Further, a correlation as a function of time is constructed for the cellular device. The machine learning algorithm then correlates the position of the cellular device with time through back propagation training algorithms and updates machine learning model 212 based on moving window database management, taking into account the position of the cellular device in a last few days.

Further, machine learning module 212 is evaluated to estimate an average demand for a Wi-Fi authentication request for a particular region, which is very useful to allocate network resources.

The position of the cellular device is further updated once the cellular device obtains access to a particular Wi-Fi access point 104A of plurality of Wi-Fi access points 104A-104N, whose position is determined by cellular operator 108 by obtaining an Address Resolution Protocol (ARP) list. Most of the MAC address authorization quota of Wi-Fi access point 104A is reserved for results from machine learning module 212 whereas some portions are utilized for online measurements.

One or more Wi-Fi access points of plurality of Wi-Fi access points 104A-104N that are closest to client device 102A are then identified. In order to identify the one or more Wi-Fi access points that are closest to client device 102A, in one embodiment, cellular operator 108 determines the one or more Wi-Fi access points from the Wi-Fi access point association table of database module 208. In another embodiment, cellular operator 108 determines the one or more Wi-Fi access points that are closest to client device 102A through localization or triangulation techniques and feeds the information to cloud platform 106. In yet another embodiment, the one or more Wi-Fi access points are identified by determining Wi-Fi access points that are in the coverage area of the cellular base station ID or Paging ID using the Wi-Fi access point association table of database module 208 and the one or more Wi-Fi access points are triggered to add corresponding entries to their MAC address Whitelist. When the cellular location of the cellular device is changed, previous whitelists of the one or more Wi-Fi access points are updated and new whitelists are created when new Wi-Fi access points are identified.

Once the one or more Wi-Fi access points are identified, cloud platform 106 transmits information associated with client device 102A to the one or more Wi-Fi access points. Upon receiving the information, the one or more Wi-Fi access points authorize client device 102A to access the one or more Wi-Fi access points based on the information associated with client device 102A.

Cloud platform 106 further includes an association monitoring module 214 that monitors the association mechanism between the user, cloud platform 106 and a cellular device of the user. Once the association is accomplished between the cellular device and Wi-Fi access point 104A, association monitoring module 214 reports a connection time and an interval pertaining to the association in order to provide additional information to machine learning module 212 and removes the MAC address corresponding to the cellular device from a whitelist of other Wi-Fi access points of plurality of Wi-Fi access points 104A-104N, providing additional flexibility of connection for other client devices. Also, association monitoring module 214 periodically provides the user information about the usage statistics and associated client devices. Further, association monitoring module 214 terminates a connection if the data download at client device 102A exceeds a threshold in order to keep a broadband quality of a Wi-Fi access point owner of Wi-Fi access point 104A above a certain limit.

In most cases, a whitelist associated with Wi-Fi access point 104A may contain only limited entries and when a limit is reached, other client devices may not be able to gain access to Wi-Fi access point 104A. Thus, association monitoring module 214 further provides a fair scheduling mechanism to cloud platform 106 and prioritizes MAC addresses of client devices in the whitelist of Wi-Fi access point 104A. Once the MAC address of client device 102A accomplishes association with Wi-Fi access point 104A, association monitoring module 214 of cloud platform 106 removes client device 102A from the whitelist of other Wi-Fi access points of plurality of Wi-Fi access points 104A-104N, excluding very close Wi-Fi access points for the purposes of roaming. If association monitoring module 214 determines that a MAC address associated with a client device does not consume any bandwidth, the MAC address of the client device is changed to a new MAC address and access is provided to the new client device. Similarly, client devices that are in the sleep mode have less priority. The considerations for removing a MAC address when overcrowding occurs are easily extendable based on a total connection time, a total download limit and an average visiting frequency.

Cloud platform 106 also includes a Wi-Fi access point mapping and management module 216 which contains the positions of each Wi-Fi access point of plurality of Wi-Fi access points 104A-104N, which are determined based on the contract between a user and cellular operator 108. The accuracy of the mapping is further increased when the user's client device connects to a particular Wi-Fi access point, whose MAC address is also known, including cell node information. Further, Wi-Fi access point mapping and management module 216 contains a database of remote access credentials for remotely managing plurality of Wi-Fi access points 104A-104N. Wi-Fi access point mapping and management module 216 is recursively triggered when online measurement becomes available or from machine learning predictions.

Further, Wi-Fi access point mapping and management module 216 configures plurality of Wi-Fi access points 104A-104N through a management server residing in the core network. Thus, Wi-Fi access point mapping and management module 216 is typically used for factory reset, get or set parameters and software upgrades.

Moving on, cloud platform includes a security module 218 that performs security operations to ensure a safe and secure connection between client device 102A and Wi-Fi access point 104A. When client device 102A is a non-SIM device, security module 218 triggers occasional hot lining of the non-SIM device to a web page or to other non-Sim devices to ask for a user defined keyword or a pre-chosen picture selection among a set defined by the user. If there is a wrong entry, security module 218 triggers an alarm and deletes the Wi-Fi MAC address of the other non-SIM devices or pauses the activity for a period of time. A second wrong input results in blocking of the user account and calling the user by a call center is followed.

In a scenario where client device 102A is a cellular device and the SIM card of the cellular device is changed, security module 218 obtains a signal from the cellular device through a cellular network. The credentials of the cellular device, including its MAC address are crosschecked in security module 218 to track any mismatch. If there is no validation, the user account is blocked for further usage and the user is forced to communicate with a call center.

In the case where one or more client devices of plurality of client device 102A-102N are stolen, an authorization of the one or more client devices are terminated if the user decides to limit internet connection for the one or more client devices remotely based on a time factor. For instance, when the user registers a non-SIM device through the webpage, security module 218 enables the user to see the connection process of individual client devices from the same webpage and terminates the authorization if the user decides to limit the Internet connection for a particular device. In addition, the connection of the non-SIM device might be limited remotely based on time limitations.

Also, security module 218 enables the user to reach the call center and monitor the position or connection status of registered client devices of the user through a security check including a keyword of the user.

Cloud platform 106 also includes a backhaul and Quality of Service (QoS) module 220 for updating backhaul of Wi-Fi access point 104A. Usually, backhaul from a digital subscriber line (DSL) is fixed based on the contract between cellular operator 108 and the user. If there are many authorized client devices for a particular Wi-Fi access point, the backhaul limit might decrease the quality of service significantly. Therefore, the backhaul associated with Wi-Fi access point 104A is updated in order to maintain QoS requirements associated with at least one of a host client device and a visitor client device above a predetermined threshold.

Cloud platform further includes a billing module 222 for charging the user based on a number of bits used during access of client device 102A to Wi-Fi access point 104A using the cellular device registered with the user account.

Finally, cloud platform 106 includes a priority module 224 for granting a specific amount of Wi-Fi access point bandwidth to the user based on the cellular device subscription of the user.

Figure 3:
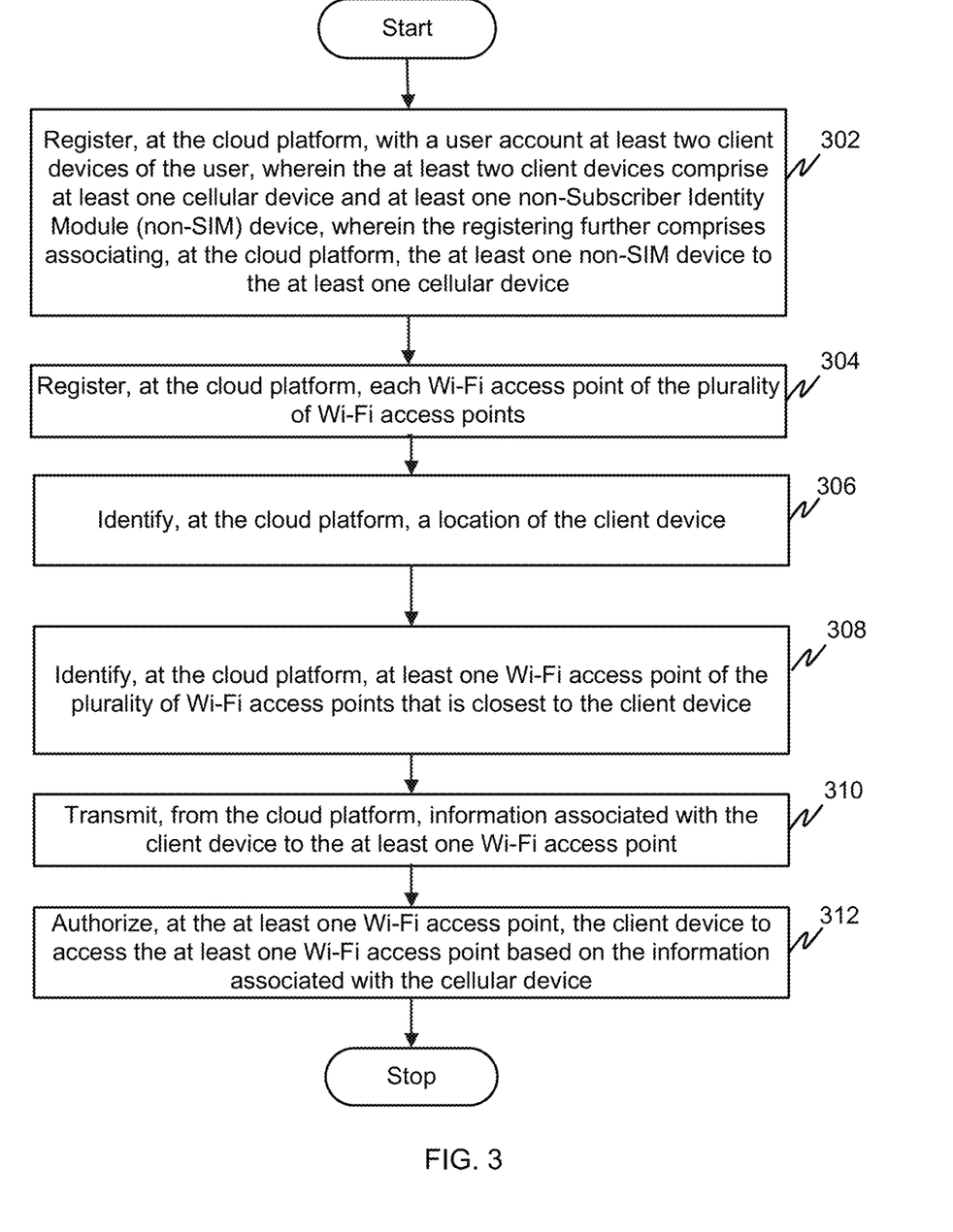
FIG. 3 illustrates a flowchart of a method for establishing a connection between a client device of a plurality of client devices and a Wi-Fi access point of a plurality of Wi-Fi access points in accordance with an embodiment of the invention.

FIG. 3 illustrates a flowchart of a method for establishing a connection between client device 102A and Wi-Fi access point 104A in accordance with an embodiment of the invention.

At step 302, two or more client devices of plurality of client devices 102A-102N of the user are registered with the user account at cloud platform 106 using registration module 206. The two or more client devices include one or more cellular devices and one or more non-SIM devices.

The registration of the two or more client devices is done through a web page, a call center or through a QR code reader application installed on the two or more client devices. The QR code reader application registers details associated with the two or more client devices such as, but not limited to, a Phone Number, Subscriber Identity Module (SIM) Card ID, Mobile Station International Subscriber Directory Number (MSISDN), International Mobile Subscriber Identity (IMSI), Temporary IMSI (TIMSI) and MAC address of the two or more client devices.

The one or more non-SIM devices are then associated with the one or more cellular devices at cloud platform 106 using registration module 206. A non-SIM device is associated to a cellular device by associating the non-SIM device MAC address with the cellular device ID. The cellular device ID is one of a SIM Card ID, IMEI of the cellular device and the cellular device Wi-Fi MAC address.

At step 304, each Wi-Fi access point of plurality of Wi-Fi access points 104A-104N is also registered at cloud platform 106 using registration module 206. Cloud platform 106 sets the SSID configuration for each Wi-Fi access point during the registration.

In order to establish a connection between client device 102A and Wi-Fi access point 104A, at step 306, a location of client device 102A is identified at cloud platform 106, wherein client device 102A is either a cellular device or a non-SIM device. Step 306 is further described in detail in conjunction with FIG. 4.

Subsequently, at step 308, one or more Wi-Fi access points of plurality of Wi-Fi access points 104A-104N that are closest to client device 102A are also identified. In order to identify the one or more Wi-Fi access points that are closest to client device 102A, in one embodiment, cellular operator 108 obtains the approximate location of a cellular base station 110A of plurality of cellular base stations 110A-110N and associates geographically closer Wi-Fi access points of plurality of Wi-Fi access points 104A-104N to a cellular base station ID of cellular base station 110A.

In another embodiment, cellular operator 108 identifies the one or more Wi-Fi access points that are closest to client device 102A through localization or triangulation techniques and feeds the information to cloud platform 106.

Once the one or more Wi-Fi access points are identified, at step 310, cloud platform 106 transmits information associated with client device 102A to the one or more Wi-Fi access points. The information transmitted from cloud platform 106 includes credentials associated with the user and client device 102A.

Upon receiving the information, at step 312, the one or more Wi-Fi access points authorize client device 102A for accessing the one or more Wi-Fi access points based on the information associated with client device 102A.

Figure 4:
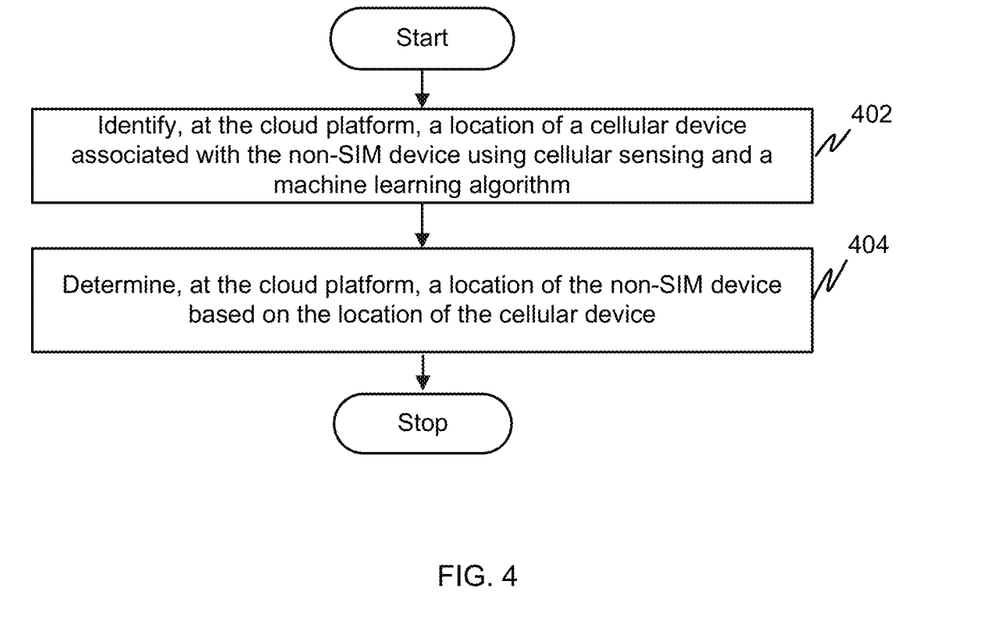
FIG. 4 illustrates a flowchart of a method for identifying location of a non-SIM device in accordance with an embodiment of the invention.

FIG. 4 illustrates a flowchart of a method for identifying location of a non-SIM device in accordance with an embodiment of the invention.

In order to identify the location of the non-SIM device, at step 402, monitoring module 210 determines a cellular device associated with the non-SIM device using the association table in database module 208 and identifies a location of the cellular device based on cellular sensing using cellular operator 108 and machine learning algorithm of machine learning module 212.

The location of the cellular device is determined using one of a cell tower fixed position and geographic density of cell towers, Long Term Evolution (LTE) positioning systems, a paging policy of cellular operator 108 and call connection signaling data collected during direct access of the cellular device to a cellular node.

The machine learning algorithm utilizes historical and accurate measurements from the cellular device to construct a behavior that summarizes historical download map for different locations at different times. The machine learning algorithm correlates the position of the cellular device with time, through back propagation training algorithms and updates machine learning module 212 based on moving window database management, taking into account the position of the cellular device in a last few days.

Thereafter, at step 404, a location of the non-SIM device is determined at cloud platform 106 based on the location of the cellular device.

The invention provides a seamless authentication mechanism for non-SIM or Wi-Fi devices and cellular devices that is integrated with cellular sensing, machine learning and security considerations using the cloud platform. The cellular sensing data is processed on the cloud platform through machine learning which delivers the probable position of a particular client device or station. The cloud platform remotely and automatically authorizes the client devices or stations by adding the MAC address of the client device or station to the whitelist of a Wi-Fi access point or router to enable a password free connection for registered users.

Further, the invention provides significant economic improvement for the operators by enabling the use of unlicensed spectrum through automatic authentication of Wi-Fi capable devices, decreasing the data exchanged over the expensive licensed spectrum. The users are authorized to obtain Wi-Fi access from external Wi-Fi access points through the cloud platform by adding the user details to Wi-Fi access point settings. Further, in order to avoid practical limits of the router management and cloud computing issues, a machine learning and statistical decision making process is included to implement a more accurate and efficient authorization process.

Thus, the invention provides a flexible and secure connection mechanism by creating an account in which the users subscribe their identifying details for the authentication of the routers remotely by the operators based on the cellular sensing.

Also, the invention provides a robust mechanism for associating a cellular device to many Wi-Fi devices or non-SIM devices. In order to associate the cellular device to the Wi-Fi devices or non-SIM devices, the user has to log the credentials to the cloud platform only once and regularly provide additional approval of the process in order to increase the security.

The association enables a non-SIM device to be authenticated if any of the cellular device owners are in the Wi-Fi hotspot zone, since the non-SIM device is assumed to be very close to the cellular device. Since the position of the non-SIM device cannot be determined through cellular signals, a particular cellular device or SIM-capable device is used to match or determine position of the non-SIM device.

Further, LTE positioning systems are utilized for improving accuracy of determination of the location of the cellular device. Thus, position tracking through Global Positioning System (GPS) tracking that is battery consuming and needs a device application for the connection becomes unnecessary.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for establishing a connection between a client device of a plurality of client devices and a Wi-Fi access point of a plurality of Wi-Fi access points using a cloud platform, the method comprising:
    registering, at the cloud platform, with a user account at least two client devices of the user, wherein the at least two client devices comprise at least one cellular device and at least one non-Subscriber Identity Module (non-SIM) device, wherein the registering further comprises associating a non-SIM device of the at least two client devices with a cellular device of the at least two client devices;
    registering, at the cloud platform, each Wi-Fi access point of the plurality of Wi-Fi access points;
    identifying, at the cloud platform, a location of the cellular device using cellular sensing and a machine learning algorithm;
    determining, at the cloud platform, a location of the non-SIM device based on the location of the cellular device;
    identifying, at the cloud platform, at least one Wi-Fi access point of the plurality of Wi-Fi access points that is closest in location to the non-SIM device;
    transmitting, from the cloud platform, information associated with the non-SIM device to the at least one Wi-Fi access point identified as closest to the non-SIM device; and
    at the at least one Wi-Fi access point identified as closest to the non-SIM device, authorizing the non-SIM device to access the at least one Wi-Fi access point identified as closest to the non-SIM device.

2. The method according to claim 1, further comprising registering the at least two client devices of the user through one of a web page, a call center, or a QR code reader application.

3. The method according to claim 2, wherein the QR code reader application registers a detail comprising one of a Phone Number, Subscriber Identity Module (SIM) Card ID, Mobile Station International Subscriber Directory Number (MSISDN), International Mobile Subscriber Identity (IMSI), Temporary IMSI (TIMSI) or MAC address.

4. The method according to claim 1, wherein registering of a Wi-Fi access point comprises setting an SSID configuration for the Wi-Fi access point.

5. The method according to claim 1, wherein associating the non-SIM device to the cellular device comprises associating a non-SIM device MAC address with a cellular device ID, wherein the cellular device ID is one of a SIM Card ID, an IMEI of the cellular device, or a the cellular device Wi-Fi MAC address.

6. The method according to claim 1, further comprising locating the cellular device using one of a cell tower fixed position with geographic density of cell towers, a Long Term Evolution (LTE) positioning system, a paging policy of a cellular operator, or call connection signaling data collected during direct access of the cellular device to a cellular node.

7. The method according to claim 1, further comprising identifying the location of the cellular device via the machine learning algorithm utilizing measurements from the cellular device to construct a historical download map for different locations at different times.

8. The method according to claim 1, wherein the machine learning algorithm correlates each position of the cellular device with a corresponding time through back-propagation training algorithms and updates a machine learning model based on moving window database management of positions of the cellular device over multiple days.

9. The method according to claim 1, further comprising evaluating the machine learning algorithm to estimate an average demand for a Wi-Fi authentication request for a particular region, wherein the average demand is used for allocating network resources.

10. The method according to claim 1, wherein identifying the at least one Wi-Fi access point comprises determining a location of the at least one Wi-Fi access point through localization or triangulation techniques.

11. The method according to claim 1, wherein identifying the at least one Wi-Fi access point comprises associating, at the cloud platform, each Wi-Fi access point of the plurality of Wi-Fi access points to a corresponding cellular base station based on a geographical location of each Wi-Fi access point.

12. The method according to claim 1, wherein the authorizing comprises triggering, by one or more processors, the at least one Wi-Fi access point to add an entry corresponding to the cellular device to a MAC address whitelist.

13. The method according to claim 12, further comprising monitoring an association between the cellular device and a given Wi-Fi access point and on determining data of the association, removing MAC addresses associated with the cellular device from whitelists of other Wi-Fi access points.

14. The method according to claim 13, wherein the MAC address associated with the cellular device is removed based on one of a total connection time, a total download limit, or an average visiting frequency.

15. The method according to claim 12, wherein the MAC address whitelist is updated when a location associated with the cellular device is changed.

16. The method according to claim 12, further comprising changing a MAC address associated with a first client device in the whitelist to a new MAC address corresponding to a second client device if the new MAC address associated with the second client device does not consume any bandwidth in order to provide a priority-based fair scheduling when overcrowding occurs due to multiple client devices requesting access.

17. The method according to claim 1, wherein the authorizing further comprises triggering a hot lining of the non-SIM device to a web page or another non-SIM device to request a user-defined authentication, wherein a first wrong input by the user triggers an alarm and causes a deletion of MAC addresses of the other non-SIM device or pauses processing for a period of time and a second wrong input results in a blocking of the user account or notifying the user via a call center.

18. The method according to claim 1, wherein the authorizing comprises validating credentials including a MAC address of the cellular device when a SIM card associated with the cellular device is changed and if the validation fails, blocking the user account and enabling the user to communicate with a call center.

19. The method according to claim 1, wherein when one of the at least two client devices is stolen, an authorization of the stolen client device is terminated if the user decides to limit internet connection for the stolen client device remotely based on a time factor.

20. The method according to claim 1, further comprising updating a backhaul associated with the at least one Wi-Fi access point when a Quality of Service (QoS) requirement is not satisfied.

21. The method according to claim 1, further comprising charging the user a fee based on a number of bits used during access to the at least one Wi-Fi access point using the cellular device.

22. The method according to claim 1, further comprising granting a specific amount of Wi-Fi access point bandwidth to the user based on a cellular device subscription of the user.

23. A system for establishing a connection between a client device of a plurality of client devices and a Wi-Fi access point of a plurality of Wi-Fi access points using a cloud platform, the system comprising:
   a memory;
   a processor communicatively coupled to the memory, wherein the processor is configured to:
      register, at the cloud platform, with a user account at least two client devices of the user, wherein the at least two client devices comprise at least one cellular device and at least one non-Subscriber Identity Module (non-SIM) device, wherein the processor is further configured to
      associate a non-SIM device of the at least two client devices with a cellular device of the at least two client devices;
      register, at the cloud platform, each Wi-Fi access point of the plurality of Wi-Fi access points;
      identify, at the cloud platform, a location of the cellular device using cellular sensing and a machine learning algorithm;
      determine, at the cloud platform, a location of the non-SIM device based on the location of the cellular device;
      identify, at the cloud platform, at least one Wi-Fi access point of the plurality of Wi-Fi access points that is closest in location to the non-SIM device;
      transmit, from the cloud platform, information associated with the non-SIM device to the at least one Wi-Fi access point identified as closest to the non-SIM device; and
      at the at least one Wi-Fi access point identified as closest to the non-SIM device, authorize the non-SIM device to access the at least one Wi-Fi access point identified as closest to the non-SIM device.

24. The system according to claim 23, wherein the processor is configured to register the at least two client devices of the user through one of a web page, a call center, or a QR code reader application.

25. The system according to claim 23, wherein the processor is configured to register a Wi-Fi access point by setting an SSID configuration for the Wi-Fi access point.

26. The system according to claim 23, wherein the processor is configured to associate the non-SIM device with the cellular device by associating a non-SIM device MAC address with a cellular device ID, wherein the cellular device ID is one of a SIM Card ID, an IMEI of the cellular device, or the cellular device Wi-Fi MAC address.

27. The system according to claim 23, wherein the location of the cellular device is determined using one of a cell tower fixed position derived from geographic density of cell towers, a Long Term Evolution (LTE) positioning system, a paging policy of a cellular operator, or call connection signaling data collected during direct access of the cellular device to a cellular node.

28. The system according to claim 23, wherein the machine learning algorithm utilizes measurements from the cellular device to construct a historical download map for different locations at different times.

29. The system according to claim 23, wherein the machine learning algorithm correlates each position of the cellular device with a corresponding time through back-propagation training algorithms and updates a machine learning model based on moving window database management of positions of the cellular device over multiple days.

30. The system according to claim 23, wherein the processor is configured to determine a location of the at least one Wi-Fi access point through localization or triangulation techniques.

31. The system according to claim 23, wherein the processor is configured to associate, at the cloud platform, each Wi-Fi access point of the plurality of Wi-Fi access points to a corresponding cellular base station based on a geographical location of each Wi-Fi access point.

32. The system according to claim 23, wherein the processor is further configured to trigger the at least one Wi-Fi access point to add an entry corresponding to the cellular device to a MAC address whitelist.

33. The system according to claim 32, wherein the processor is further configured to monitor an association between the cellular device and a given Wi-Fi access point and on determining data of the association, remove MAC addresses associated with the cellular device from whitelists of other Wi-Fi access points.

34. The system according to claim 33, wherein the MAC address associated with the cellular device is removed based on one of a total connection time, a total download limit, or an average visiting frequency.

35. The system according to claim 33, wherein the processor is further configured to trigger a MAC address associated with a first client device in the whitelist to be changed to a new MAC address corresponding to a second client device if the new MAC address associated with the second client device does not consume any bandwidth in order to provide a priority-based fair scheduling when overcrowding occurs due to multiple client devices requesting access.

36. The system according to claim 23, wherein the processor is configured to authorize the non-SIM device to access the at least one Wi-Fi access point identified as closest to the non-SIM device by triggering hot lining of the at least one non-SIM device to one of a web page or another non-SIM device to request a user-defined authentication.

37. The system according to claim 23, wherein when one of the at least two client devices is stolen, an authorization of the stolen client device is terminated if the user decides to limit internet connection for the stolen client device remotely based on a time factor.

38. The system according to claim 23, wherein the processor is configured to update a backhaul associated with the at least one Wi-Fi access point when a Quality of Service (QoS) requirement is not satisfied.

39. The system according to claim 23, wherein the processor is configured to charge the user a fee based on a number of bits used during access to the at least one Wi-Fi access point using the cellular device.

40. The system according to claim 23, wherein a specific amount of Wi-Fi access point bandwidth is granted to the user based on a cellular device subscription of the user.

* * * * *